(12) United States Patent
Murakowski et al.

(10) Patent No.: US 9,287,990 B2
(45) Date of Patent: Mar. 15, 2016

(54) RECYCLED CARRIER MODULATION IN COMPOUND RESONATOR CONFIGURATIONS

(71) Applicant: Phase Sensitive Innovations, Inc., Newark, DE (US)

(72) Inventors: Janusz Murakowski, Bear, DE (US); Garrett Schneider, New Castle, DE (US); Christopher A. Schuetz, Avondale, PA (US); Dennis W. Prather, Newark, DE (US)

(73) Assignee: Phase Sensitive Innovations, Inc., Newark, DE (US)

( * ) Notice: Subject to any disclaimer, the term of this patent is extended or adjusted under 35 U.S.C. 154(b) by 9 days.

(21) Appl. No.: 14/243,435

(22) Filed: Apr. 2, 2014

(65) Prior Publication Data

US 2015/0139656 A1    May 21, 2015

Related U.S. Application Data

(63) Continuation-in-part of application No. 14/083,671, filed on Nov. 19, 2013.

(51) Int. Cl.
*H04B 10/04* (2006.01)
*H04B 10/516* (2013.01)
*H04B 10/2575* (2013.01)
*H04B 10/50* (2013.01)

(52) U.S. Cl.
CPC .......... *H04B 10/516* (2013.01); *H04B 10/2575* (2013.01); *H04B 10/505* (2013.01); *H04B 10/5057* (2013.01); *H04B 10/5059* (2013.01)

(58) Field of Classification Search
CPC ............ H04B 10/516; H04B 10/2575; H04B 10/505; H04B 10/5057; H04B 10/50572; H04B 10/5059; H04B 10/50593; H04B 10/50575; H04B 10/50577; H04B 10/50595; H04B 10/50597; H04B 10/588
USPC ......................................... 398/115, 195, 198
See application file for complete search history.

(56) References Cited

U.S. PATENT DOCUMENTS

| | | |
|---|---|---|
| 2005/0036791 A1 | 2/2005 | Gunn et al. |
| 2005/0135449 A1 | 6/2005 | Sorin et al. |
| 2005/0283815 A1 | 12/2005 | Brooks et al. |
| 2010/0196013 A1* | 8/2010 | Franklin ...................... 398/115 |

OTHER PUBLICATIONS

Office Action issued Oct. 16, 2015 in U.S. Appl. No. 14/083,671 by Murakowski.

* cited by examiner

*Primary Examiner* — M. R. Sedighian
(74) *Attorney, Agent, or Firm* — Panitch Schwarze Belisario & Nadel LLP (57) ABSTRACT

An optical modulation apparatus for modulating an electromagnetic (e.g., radio frequency (RF)) signal onto an optical carrier signal may be arranged to feed back at least a portion of the optical carrier signal, while excluding first-order sidebands, which may help increase modulation efficiency and improve output power, while retaining high modulation bandwidth. Such arrangements may be implemented, for example, using a Fabry-Perot resonator or a ring resonator in combination with a Mach-Zehnder interferometer or a Michelson interferometer.

17 Claims, 12 Drawing Sheets

RECYCLED CARRIER MODULATION IN COMPOUND RESONATOR CONFIGURATIONS

CROSS-REFERENCE TO RELATED APPLICATION

This application is a continuation-in-part of U.S. patent application Ser. No. 14/083,671, entitled, "Recycled Carrier Modulation," filed on Nov. 19, 2013, commonly-owned, and incorporated herein by reference in its entirety.

FIELD OF THE INVENTION

Embodiments of the invention may relate to modulation of optical carrier signals.

BACKGROUND

Modulator efficiency, in addition to bandwidth, is an important parameter in characterizing a modulator. In electro-optic modulators, the efficiency is often expressed as $V_\pi$, which is the voltage amplitude required to effect a $\pi$-shift in phase of the light beam propagating through it. Alternatively, and equivalently, the modulator efficiency can be expressed as the proportionality constant that relates the amount of power in the sidebands of the modulated signal to the product of the radio frequency (RF) and the optical powers entering the modulator. For example, if a modulator efficiency is 1 $W^{-1}$, it means that with one watt of optical power entering the modulator, and one watt of RF power coming in, the power in the sideband at the modulator output is one watt. 0.5 $W^{-1}$ efficiency would mean that with the same inputs as above (1 W optical and 1 W RF in), only 0.5 W would be detected in the sideband at the modulator output. Any approach that can improve on existing modulator efficiencies, particularly without compromising bandwidth, would be desirable.

In U.S. patent application Ser. No. 14/083,671, the applicant presented an optical modulation method in which an output modulated optical signal of an optical modulator was processed so at least a portion of the optical carrier signal could be fed back to an input of the modulator and thus increase optical carrier power. In that approach, (at least a portion of) the optical carrier signal, without sidebands resulting from the modulation, was to be fed back.

BRIEF SUMMARY OF EMBODIMENTS OF THE INVENTION

Various embodiments of the present invention may address the issue of modulation efficiency in optical modulators. In particular, various embodiments of the invention may present an optical modulation using recycling of a carrier signal, along with even sidebands of a modulated optical signal, by using compound resonator configurations, which may, for example, simplify implementation in comparison with the alternatives presented in the prior application discussed above.

BRIEF DESCRIPTION OF THE DRAWINGS

Various embodiments of the invention will now be described in conjunction with the accompanying drawings, in which.

DETAILED DESCRIPTION

Figure 1:
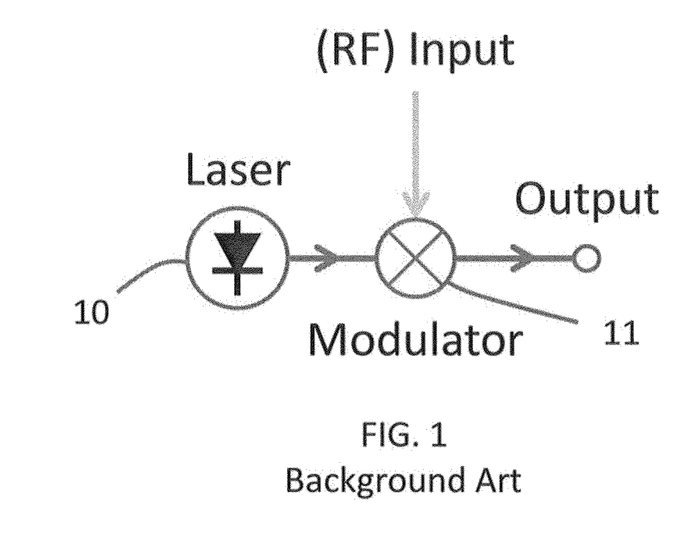
FIG. 1 shows a background art example of a modulator.

Various aspects of the present disclosure present new methods and devices for modulation of optical carrier signals. In a conventional modulator, as shown in FIG. 1, an optical signal (or, as used interchangeably in this disclosure, beam), typically, but not necessarily, from a laser 10, may be input to a modulator 11. At the modulator 11, the signal may undergo a change dependent on the applied electrical (e.g., radio-frequency (RF)) signal. The change may be, for example, in the phase (in a phase modulator) or in the amplitude (in an amplitude modulator) of the optical beam; but other variations are possible, as well. In the frequency domain, the presence of modulation may manifest in the form of sidebands flanking the pure tone of the optical carrier frequency.

Figure 2:
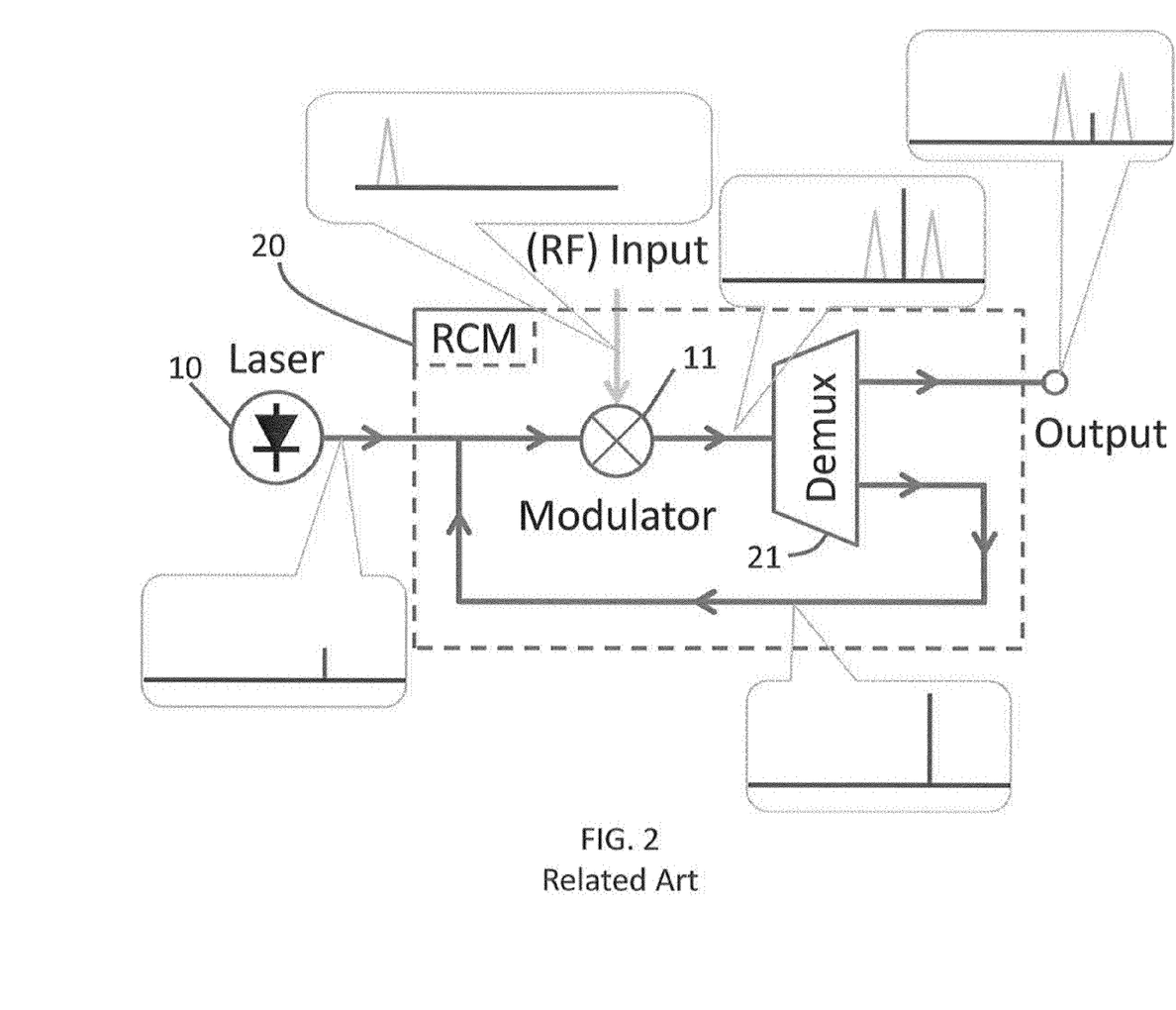
FIG. 2 shows an example of a conceptual block diagram of a recycled-carrier modulator (RCM) according to a previously-filed application.

FIG. 2 shows a block diagram that conceptually illustrates an approach taken in U.S. patent application Ser. No. 14/083,671. According to this conceptual example, the output of the modulator 11 may be split into two paths: one carrying mostly the sidebands (suppressed carrier), and one with mostly the carrier present (sidebands filtered out). This splitting is schematically represented in FIG. 2 using a demultiplexer 21 but may be achieved using a variety of methods/apparatus. The signal of the latter path may then be combined with the input of the modulator 11. The combination of modulator 11 and demultiplexer 21, along with a feedback path, may thus form a recycled-carrier modulator (RCM) 20. FIG. 2 shows the spectral content of the signals that may occur, in the frequency domain, at various points in the apparatus, using callout balloons. As shown, the input optical power of the pure tone carrier to the modulator 11 may be increased as a result of this "recycling" of the optical carrier. The increase in the optical power entering the modulator 11 may, in turn, result in higher power in the sidebands at the modulator output. i.e., higher modulation efficiency.

Figure 3A:
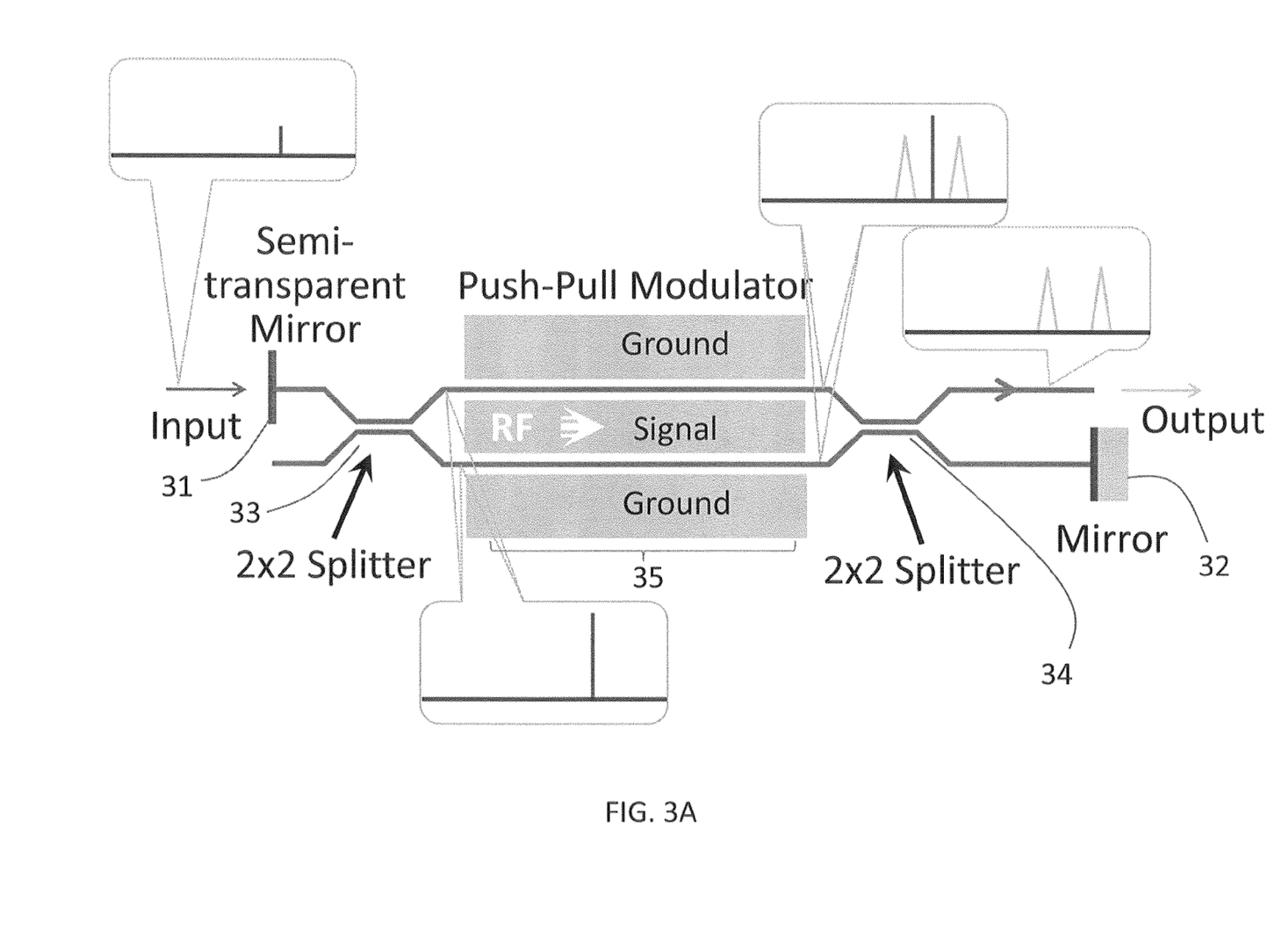
FIGS. 3A-3C show a first example of a modulation system according to the present disclosure.
Figure 3B:
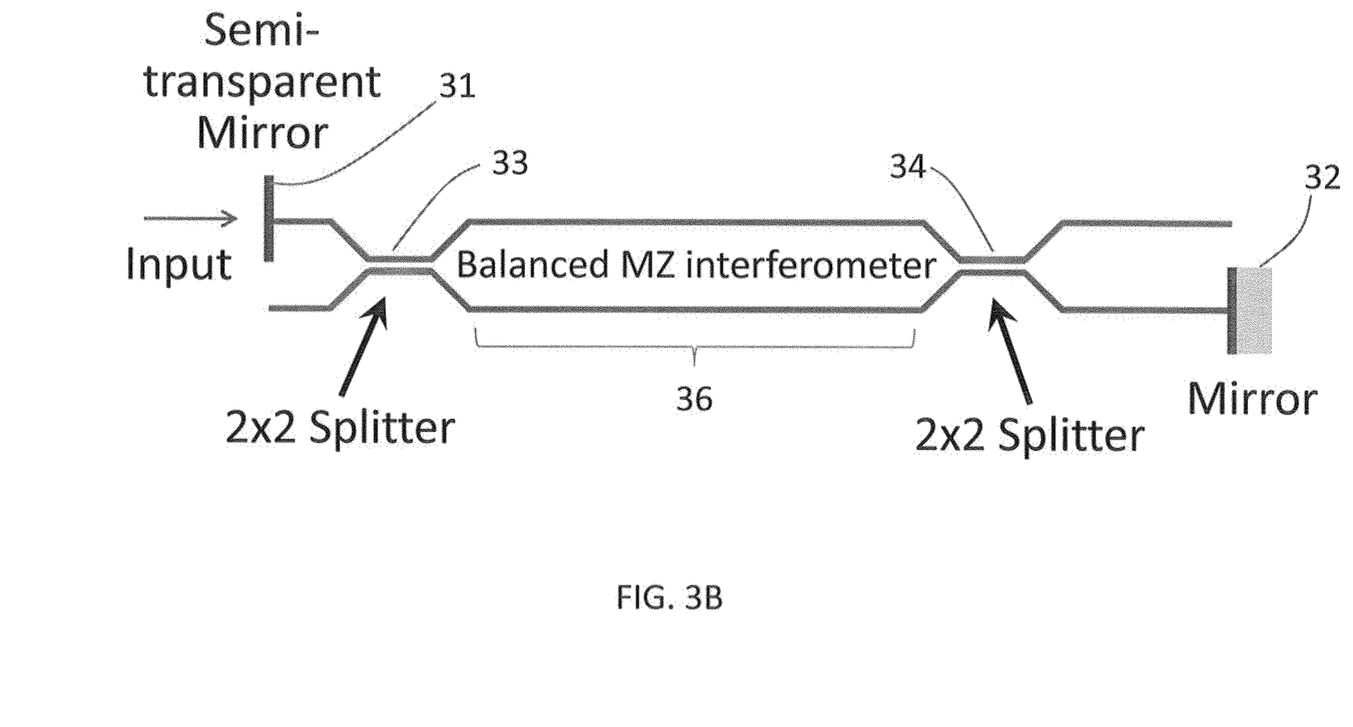
Figure 3C:
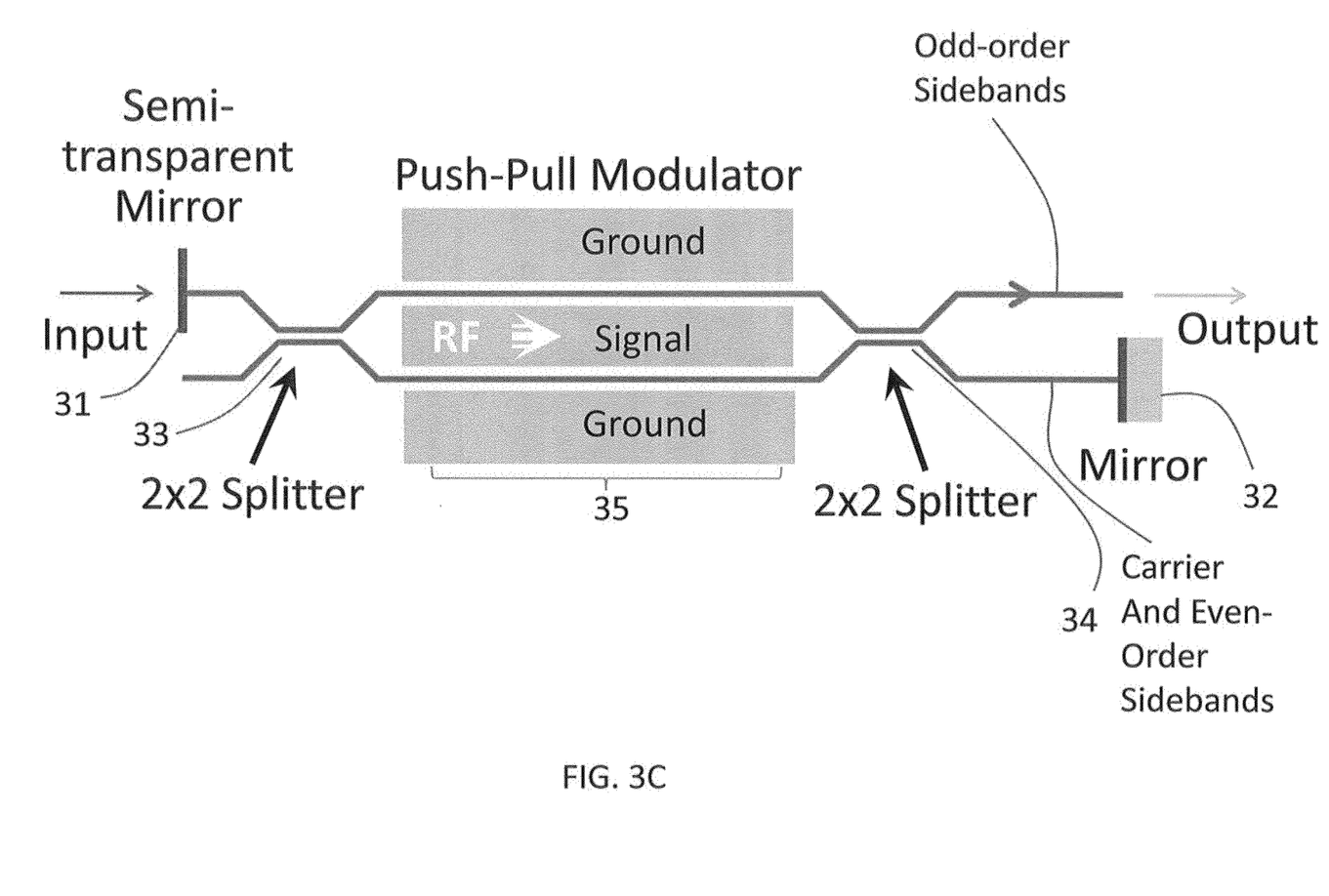

FIGS. 3A-3C show a first example of an optical modulation system using a modified approach. In various examples according to the present disclosure, compound resonator implementations may be used to provide separation of the carrier from the sidebands and recycling of the carrier. In particular, in this first example, sideband separation and carrier recycling may be implemented using a combination of a Fabry-Perot resonator with a Mach-Zehnder interferometer. As shown in FIGS. 3A and 3B, a Fabry-Perot resonator may be formed between semi-transparent mirror 31 and a mirror 32. An input light signal, e.g., from a laser, laser diode, or other source (not shown), may be fed into a first arm of a 2×2 splitter 33 through semi-transparent mirror 31. This is fed into a push-pull modulator 35 that may include a Mach-Zehnder interferometer 36, an example of which is shown explicitly in FIG. 3B. The input beam from splitter 33 may be evenly split between the upper and lower branches of Mach-Zehnder interferometer 36 and then recombined in a second 2×2 splitter 34. If the lengths of the arms of the Mach-Zehnder interferometer are matched, or if they differ by an integer multiple of the input (carrier) wavelength, the second 2×2 splitter 34 may direct the light of the carrier toward mirror 32. Light reflected from the mirror 32 may be split by the second splitter 34 and directed back through the Mach-Zehnder interferometer 36 toward semi-transparent mirror 31. That is, a Fabry-Perot resonator may thus be formed by the semi-transparent mirror 31; the upper waveguide between the semi-transparent mirror 31 and the first 2×2 splitter 33; the 2×2 splitter 33; both arms of Mach-Zehnder interferometer 36, which may be a balanced Mach-Zehnder interferometer; the second 2×2 splitter 34; the lower waveguide between splitter 34 and mirror 32; and mirror 32. For the carrier wavelength corresponding to the resonance of the Fabry-Perot resonator, the amplitude of the standing wave may be increased as compared to the amplitude of the incoming carrier signal (resonant carrier enhancement). This increase may result in increased modulation efficiency of the RCM.

Modulation of the optical carrier, e.g., by an RF signal, may be realized by means of a push-pull modulation configuration 35, as shown in FIGS. 3A and 3C. The modulation of the optical signal may result in the generation of sidebands on the optical beams traveling in the two arms of the Mach-Zehnder interferometer, in which, as long as the optical and RF velocities are properly matched, the modulation may predominantly occur, e.g., on the right-moving components (i.e., right-moving with respect to what is shown in FIGS. 3A-3C) of a standing optical wave generated in the Mach-Zehnder interferometer 36. The push-pull arrangement of modulator 35 may ensure that as the optical wave in the upper arm of the Mach-Zehnder interferometer 36 is advanced, the optical wave in the lower arm is retarded, and vice versa, under the influence of an input RF signal. As a result, odd-order sidebands may be directed toward the upper arm of the output of splitter 34, while even-order sidebands and the carrier wavelength may be directed toward the lower arm of splitter 34, toward mirror 32, from which they may then be reflected back. Note that, in various configurations, depending upon how the various components are arranged, "upper" and "lower" may be interchanged for various components, and the invention is not necessarily limited to the labeling of the various arms of the various components as described here and shown in the drawings.

To explain the above in mathematical terms, an optical wave propagating in a pair of waveguides, such as in the arrangement of FIGS. 3A-3C, may be represented as a pair of time-dependent signals, A(t) and B(t), which may be arranged in a vector, $$\begin{pmatrix} A(t) \\ B(t) \end{pmatrix}, \tag{1}$$

where A(t) may represent the time-dependent field amplitude in the upper waveguide, and B(t) may represent the time-dependent field amplitude in the lower waveguide. In this formalism, a 2×2 beam splitter may be represented as a matrix $$\frac{1}{\sqrt{2}} \begin{pmatrix} 1 & i \\ i & 1 \end{pmatrix}. \tag{2}$$

Here, $i=\sqrt{-1}$. Thus, if a 2×2 splitter is presented with fields A and B at its input ports (where the time indices are dropped for the sake of compactness of notation), the amplitudes at its output ports will be represented by a vector $$\frac{1}{\sqrt{2}} \begin{pmatrix} 1 & i \\ i & 1 \end{pmatrix} \begin{pmatrix} A \\ B \end{pmatrix} = \frac{1}{\sqrt{2}} \begin{pmatrix} A+iB \\ iA+B \end{pmatrix}. \tag{3}$$

In particular, if a non-vanishing signal $Ae^{i\omega t}$ is present only at the upper input port of a 2×2 splitter, then the field amplitudes at its output ports read $(A/\sqrt{2})e^{i\omega t}$ and $(iA/\sqrt{2})e^{i\omega t}$, respectively, where ω is the optical frequency. Since in the example of FIGS. 3A-3C, the optical carrier beam enters at the upper input port of a 2×2 splitter 33, $(A/\sqrt{2})e^{i\omega t}$ and $(iA/\sqrt{2})e^{i\omega t}$ may represent the field amplitudes in the two arms at the beginning of the balanced Mach-Zehnder interferometer 36 of the push-pull modulator 35.

Phase modulation may convert a monochromatic optical beam $Ae^{i\omega t}$ to $Ae^{i[\omega t+\phi(t)]}$, where φ(t) is the time-dependent modulation. For single-tone modulation at RF frequency Ω, the time-dependence of the modulated signal becomes $Ae^{i[\omega t+m\sin(\Omega t)]}$, where m is the amplitude of the modulating signal scaled by the modulation efficiency. In a push-pull modulator configuration 35 of FIG. 3A or 3C, the modulated signals in the two arms at the end of the modulation section 35 may become $$\begin{pmatrix} (A/\sqrt{2})e^{i\omega t} \\ (iA/\sqrt{2})e^{i\omega t} \end{pmatrix} \rightarrow \begin{pmatrix} (A/\sqrt{2})e^{i[\omega t+m\sin(\Omega t)]} \\ (iA/\sqrt{2})e^{i[\omega t-m\sin(\Omega t)]} \end{pmatrix} = \frac{Ae^{i\omega t}}{\sqrt{2}} \begin{pmatrix} e^{im\sin(\Omega t)} \\ ie^{-im\sin(\Omega t)} \end{pmatrix}. \tag{4}$$

The second 2×2 splitter 34 may effectively multiply the vector (4) by the matrix (2), resulting in $$\frac{1}{\sqrt{2}} \begin{pmatrix} 1 & i \\ i & 1 \end{pmatrix} \frac{Ae^{i\omega t}}{\sqrt{2}} \begin{pmatrix} e^{im\sin(\Omega t)} \\ ie^{-im\sin(\Omega t)} \end{pmatrix} = \frac{Ae^{i\omega t}}{2} \begin{pmatrix} e^{im\sin(\Omega t)} - e^{-im\sin(\Omega t)} \\ ie^{im\sin(\Omega t)} + ie^{-im\sin(\Omega t)} \end{pmatrix}. \tag{5}$$

Thus, the signal in the upper output port of the second 2×2 splitter 34 may be represented as $$\frac{Ae^{i\omega t}}{2}[e^{im\sin(\Omega t)} - e^{-im\sin(\Omega t)}], \tag{6}$$

whereas the signal in the lower output port of the second 2×2 splitter 34 may be represented as $$\frac{iAe^{i\omega t}}{2}[e^{im\sin(\Omega t)} + e^{-im\sin(\Omega t)}]. \tag{7}$$

The exponential functions in the square brackets of expressions (6) and (7) can be expanded in a Fourier series with the help of the Jacobi-Anger expansion, $$e^{im\sin(\Omega t)} = \sum_{n=-\infty}^{\infty} J_n(m)e^{in\Omega t}, \quad e^{-im\sin(\Omega t)} = \sum_{n=-\infty}^{\infty} J_n(-m)e^{in\Omega t}, \tag{8}$$

where $J_n$ is the n-th Bessel function of the first kind. As a result, the expressions for the signal amplitudes in the upper (6) and the lower (7) output ports of the second 2×2 splitter 34 may be written as $$\frac{Ae^{i\omega t}}{2} \sum_{n=-\infty}^{\infty} [J_n(m) - J_n(-m)]e^{in\Omega t} \quad (9)$$

and $$\frac{iAe^{i\omega t}}{2} \sum_{n=-\infty}^{\infty} [J_n(m) + J_n(-m)]e^{in\Omega t}, \quad (10)$$

respectively. Given the following property of the Bessel function $J_n$ with integer n, $$J_n(-m) = (-1)^n J_n(m), \quad (11)$$

expressions (9) and (10) can be further simplified to $$Ae^{i\omega t} \sum_{n=-\infty}^{\infty} J_{2n+1}(m) e^{i(2n+1)\Omega t} \quad (12)$$

and $$iAe^{i\omega t} \sum_{n=-\infty}^{\infty} J_{2n}(m) e^{i2n\Omega t}, \quad (13)$$

which show explicitly that the upper output port of the second 2×2 splitter 34 (12) contains only odd-order modulation sidebands, whereas the lower output port of the same splitter 34 (13) contains only even-order modulation sidebands—including the zero-order, or carrier wavelength.

The analysis presented above shows that in a properly biased, balanced Mach-Zehnder interferometer with push-pull modulator configuration, the odd sidebands may be naturally separated from the even sidebands, and from the carrier, at the output. Such separation may allow resonant enhancement of the carrier wavelength in the modulation region without affecting (recycling) the first-order modulation sidebands, containing the signal of interest.

While the above example uses a Fabry-Perot resonator configuration in combination with a Mach-Zehnder interferometer, this is only one example of how recycled carrier modulation may be implemented in a compound resonator configuration. The effect that may be implemented by the Fabry-Perot/Mach-Zehnder configuration described above is that of resonant carrier enhancement and interferometric separation of sidebands of interest from the carrier. This effect may be achieved using other configurations, as well.

Figure 4A:
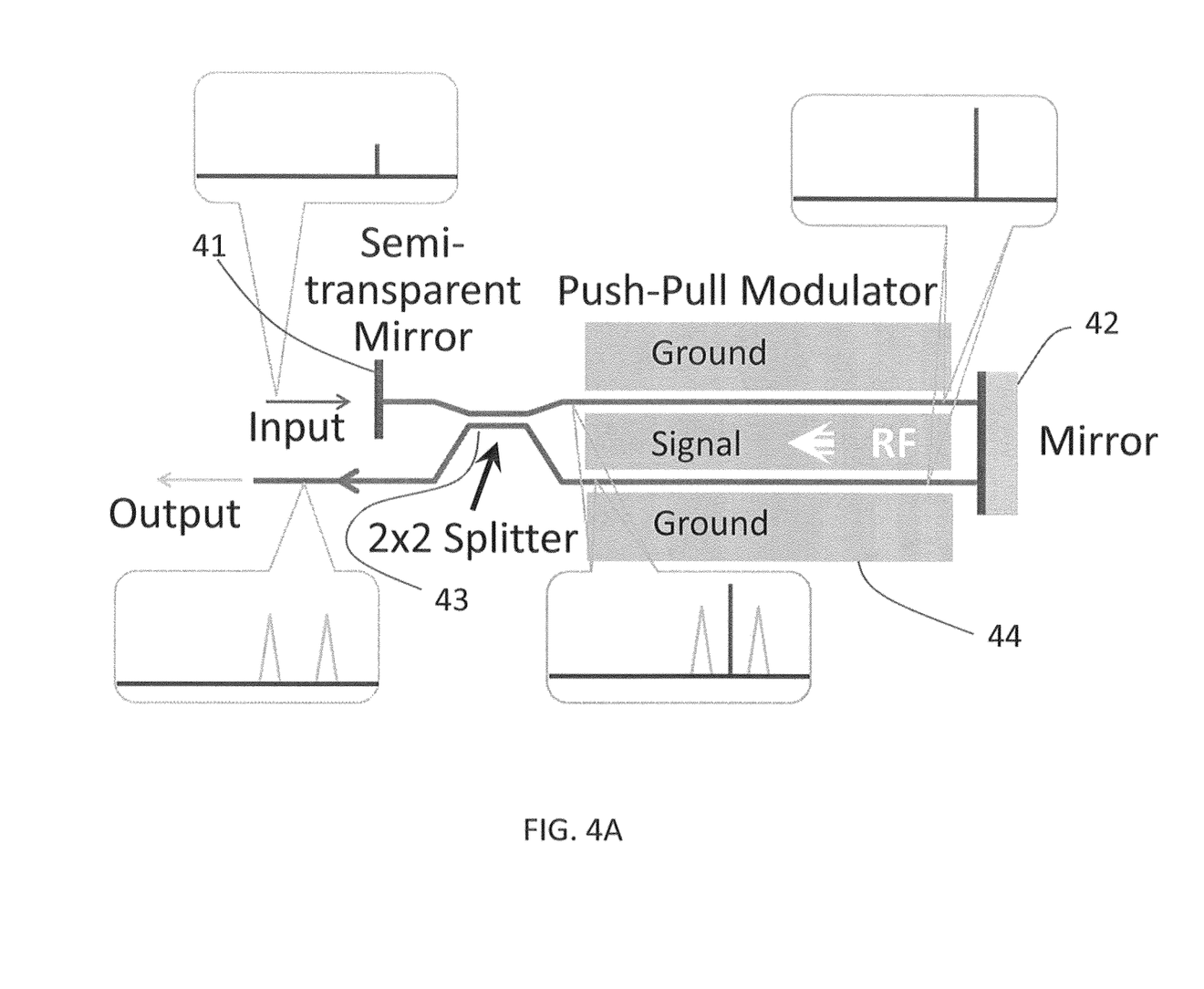
FIGS. 4A-4C show a second example of a modulation system according to the present disclosure.
Figure 4B:
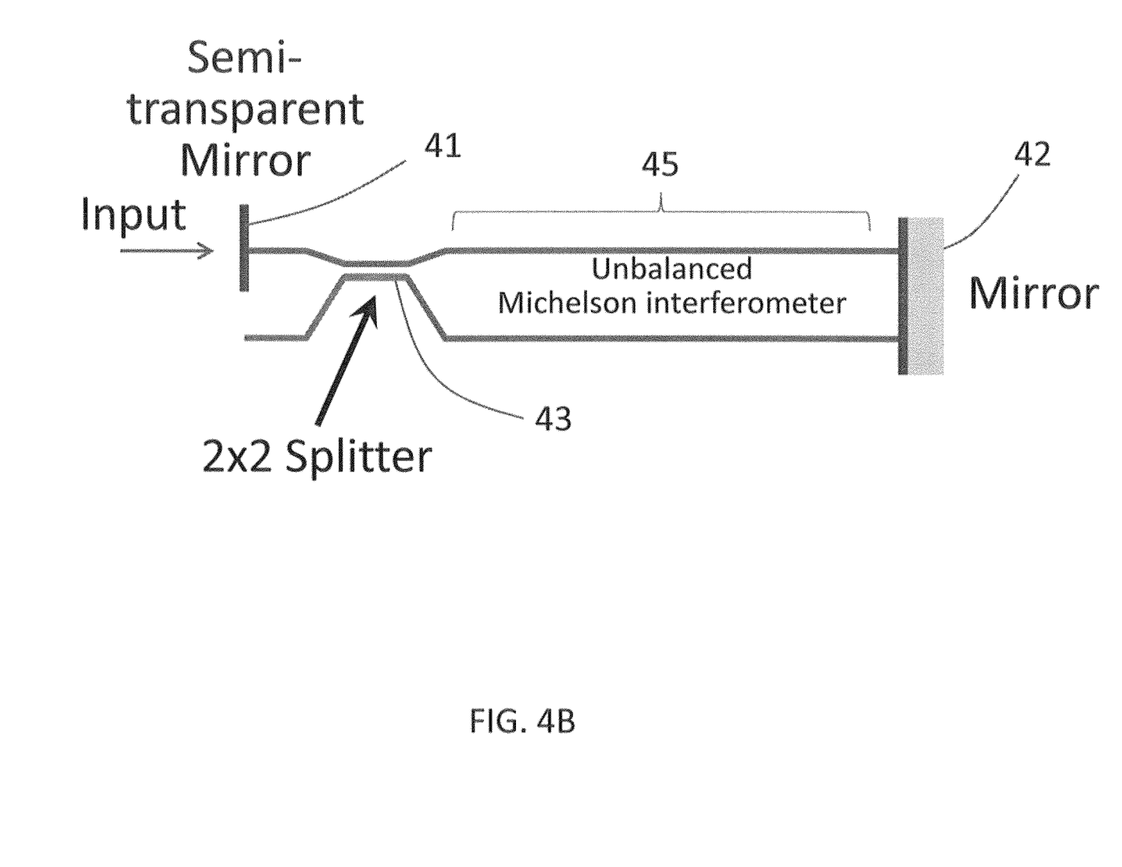
Figure 4C:
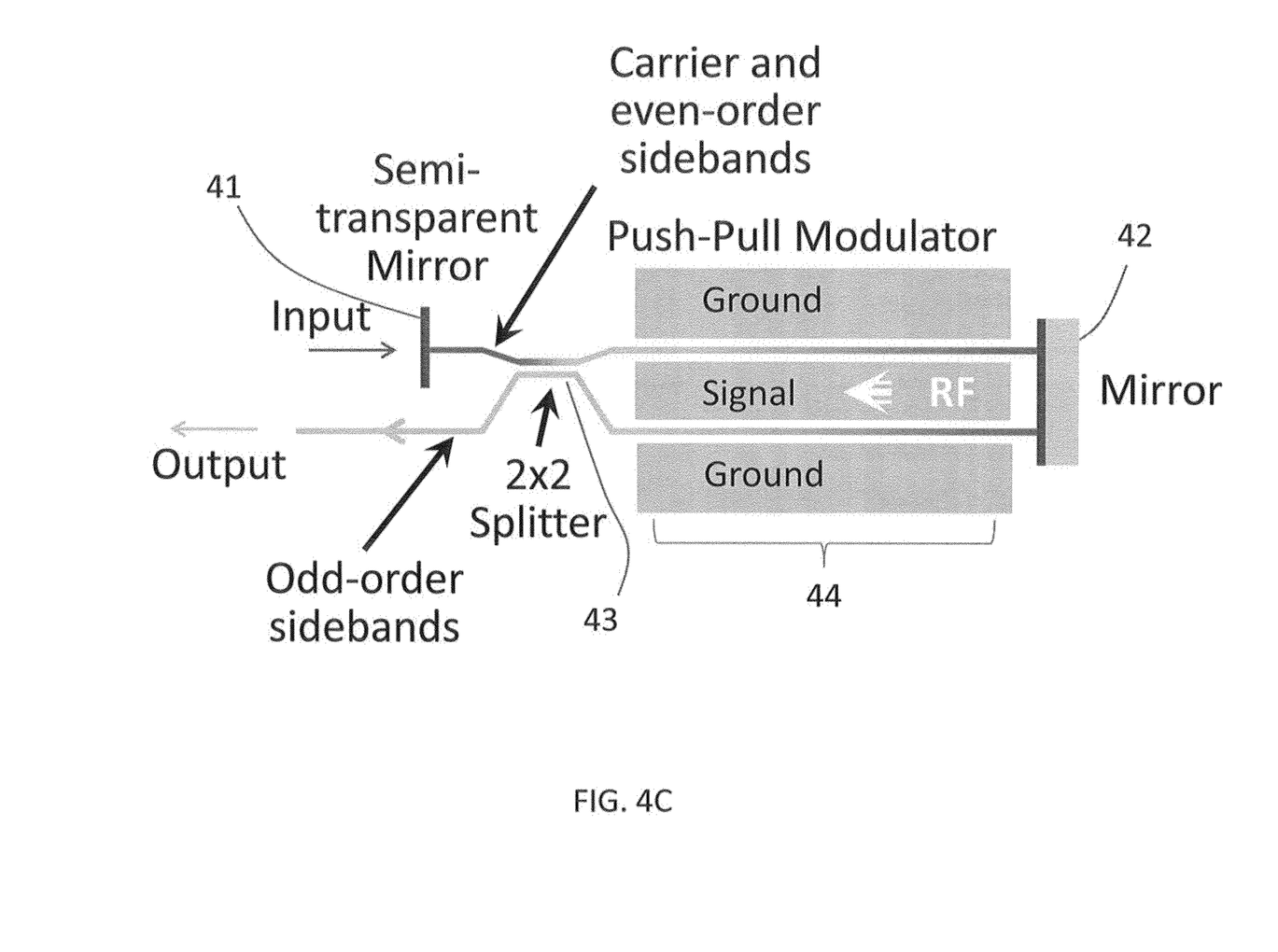

FIGS. 4A-4C show an example of such a further modulator configuration. As shown in FIGS. 4A-4C, the resonant carrier enhancement and interferometric separation of the sidebands may be achieved in a Michelson interferometer configuration. Conceptually, this may be thought of as being similar to a folded version of the above-described Mach-Zehnder interferometer-based example, where the "folding" is done by means of mirror 42. However, in order to obtain separation of the carrier and even sidebands from the odd sidebands, the effective arm lengths of the Michelson interferometer may differ by a quarter-wavelength or an odd multiple of a quarter wavelength.

As shown in FIGS. 4A-4C, the modulator according to this example may include a semi-transparent mirror 41, through which an optical carrier, which again may be fed from an optical source, as above (not shown). The semi-transparent mirror 41 is coupled to a 2×2 splitter 43 via a waveguide. The splitter 43 is coupled to a push-pull modulator 44, which is coupled to a mirror 42. The push-pull modulator 44 may include an unbalanced Michelson interferometer 45, as shown in FIG. 4B. The result may be thought of as a Michelson-Fabry-Perot resonator that includes the two mirrors 41 and 42; the waveguide connecting the mirror 41 and the splitter 43, and both arms of the unbalanced Michelson interferometer 45. As in the cases of the recycled carrier modulation of U.S. patent application Ser. No. 14/083,671 and the previous example, optical carrier power oscillating in this compound resonator may be enhanced in comparison with the input optical power.

Modulation of the optical carrier may be realized by a push-pull modulator configuration 44, as shown in FIGS. 4A and 4C. The modulation imposes sidebands on the optical beams traveling in the arms of Michelson interferometer 45, in which, as long as the optical and RF velocities are properly matched, the modulation may occur on the left-moving components (in the configuration as shown in FIGS. 4A-4C; in other arrangements of the components, modulation may occur on components moving in other directions) of the resulting standing optical wave. The push-pull arrangement of modulator 44 may ensure that as the optical wave traveling in the upper arm of the Michelson interferometer is advanced, the optical wave in the lower arm is retarded, and vice versa, under the influence of an RF signal introduced in modulator 44. As a result, the odd-order sidebands may be directed to the lower arm of 2×2 splitter 43, while the even-order sidebands and the carrier frequency may be directed toward the upper arm of splitter 43 and reflected by semi-transparent mirror 41 forming a Fabry-Perot resonant cavity.

Figure 5A:
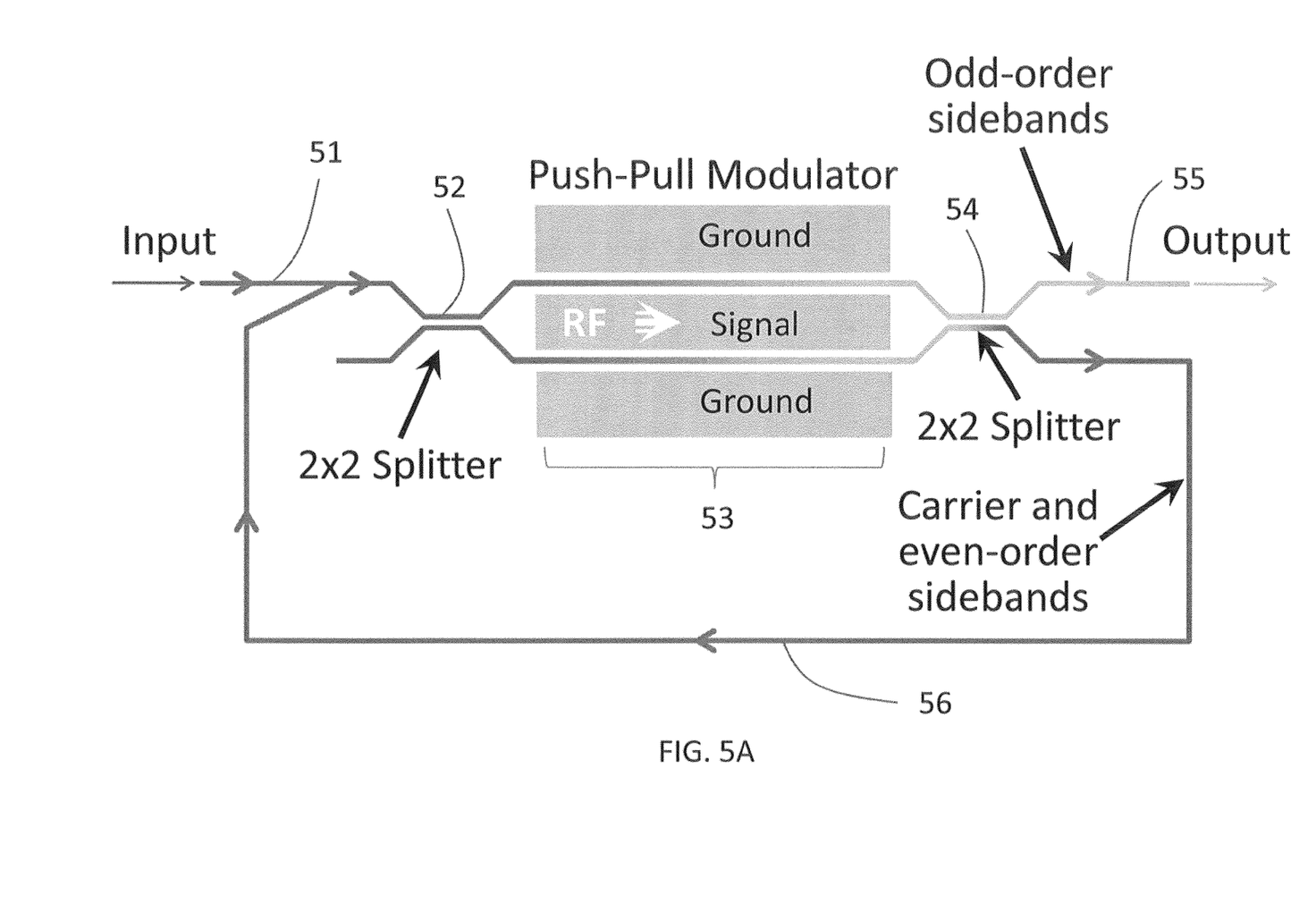
FIGS. 5A and 5B show a third example of a modulation system according to the present disclosure.
Figure 5B:
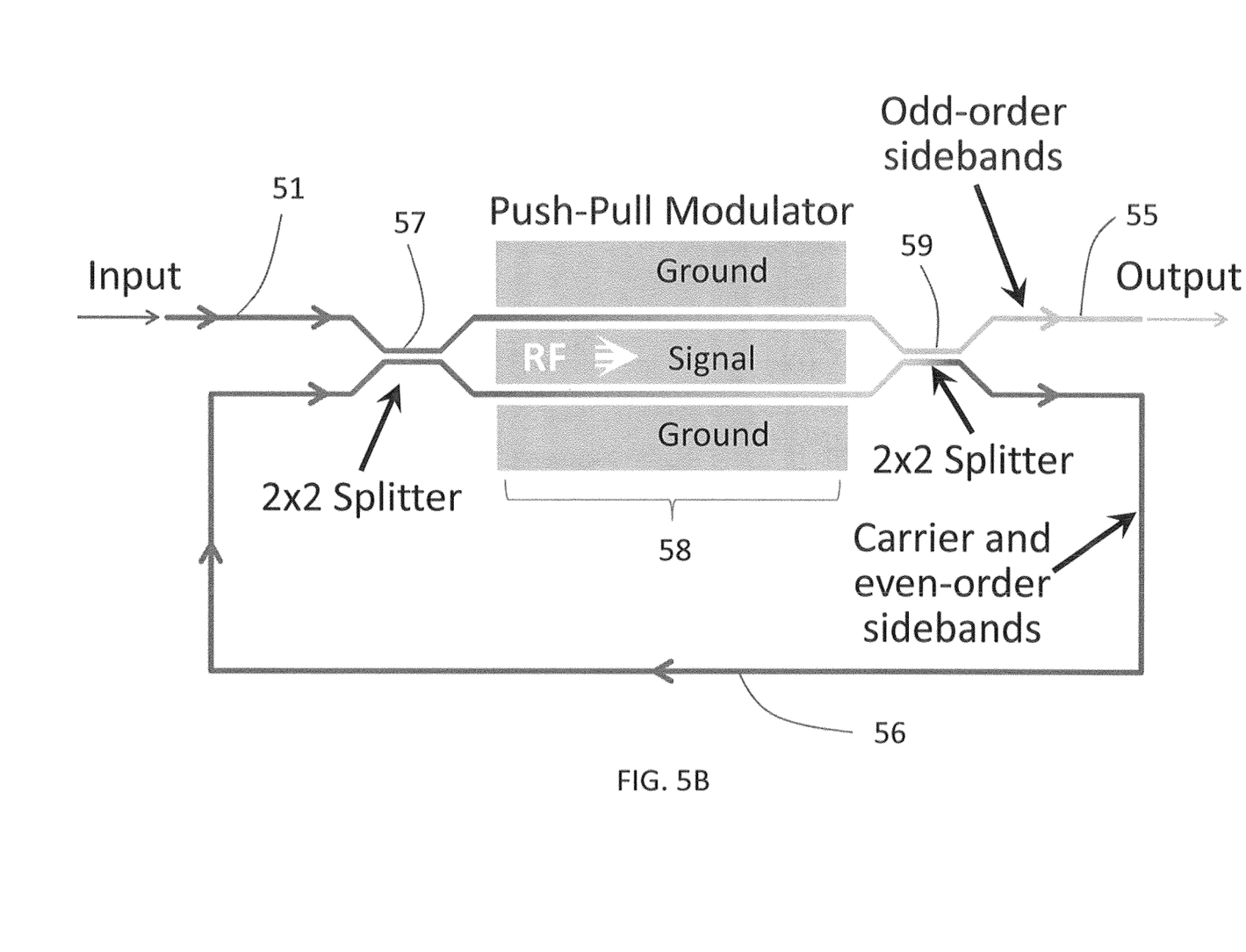

FIGS. 5A and 5B show diagrams of yet another example of a modulator configuration according to the present disclosure. An optical beam at an input 51 in FIG. 5A may be fed into a first 2×2 splitter 52, which may be coupled to an optical modulator, such as push-pull modulator 53, which may be coupled to a second 2×2 splitter 54. Splitter 54 may operate to separate the even-order sideband components, including the zero-order (carrier) component, of the modulator 53 output from the odd-order sideband components. One arm of the splitter 54 may feed back 56 at least a portion of the even-order sideband and optical carrier components to the input 51, while the other arm of the splitter 54 may output the odd-order sideband components to an output 55. As a result, the optical carrier power at the push-pull modulator 53 may be increased as compared to the power at the input 51, which may result in improved efficiency of modulation and greater sideband power at the output 55. Alternatively, as per FIG. 5B, the optical carrier may be fed back 56 from the lower arm of splitter 59 to the lower arm of splitter 57. To accomplish the separation of the first-order sidebands from the carrier in this configuration, the splitters 57 and 59 and the push-pull modulator 58 may be unbalanced, the latter both in terms of the arm length and the modulation efficiency. Compared to the configurations of FIGS. 3A-3C, Fabry-Perot/Mach-Zehnder, and FIGS. 4A-4C, Fabry-Perot/Michelson, the configuration of FIGS. 5A-5B may be thought of as ring-resonator/Mach-Zehnder compound-resonator RCM.

Comparing FIGS. 3A-3C and FIGS. 5A-5B, a difference is that the even-order sideband components of FIGS. 3A-3C may be fed back through the modulator 35/interferometer 36, while FIGS. 5A and 5B show a separate feedback path 56. In contrast, in the example shown in FIGS. 4A-4C, the feedback may also be through the modulator 44/interferometer 45, but the splitter 43 may perform functions of both splitters 33, 34 of FIGS. 3A-3C, in that the apparatus of FIGS. 4A-4C may be thought of a being "folded," as discussed above, with respect to the apparatus of FIGS. 3A-3C. Again, this is in contrast to the example of FIGS. 5A-5B, where there is a separate feedback path 56. Nonetheless, the common features of the examples presented above may include: (1) push-pull modulation, (2) interferometric separation of odd-order sidebands (in particular, the first-order sidebands) from the carrier, and (3) recycling of the carrier (along with, incidentally, even-order sidebands).

It is noted that the modulation process may impose several sidebands on the optical signal—see, e.g., Eq. (8) above. Of those, the first-order sidebands, corresponding to $n=\pm 1$ in expansion (8), are typically dominant—especially for low amplitude of the RF signal. The reason is that the amplitude of the first-order sideband depends linearly on the input RF amplitude in the lowest order. By comparison, the amplitude of the second-order sideband depends quadratically on the input RF amplitude in the lowest order. Thus, the same (low) input RF amplitude yields higher first-order-sideband amplitude than the second-order-sideband amplitude. As a result, for the operation of the RCM, it may be desirable to separate the first-order (dominant) sidebands from the carrier prior to feeding the carrier back to the modulator input. The generation and the presence of higher-order sidebands in the RCM may be considered incidental, and whether the higher-order sidebands follow the carrier or the first-order sidebands may be of only secondary importance to the RCM operation as discussed here.

Figure 7:
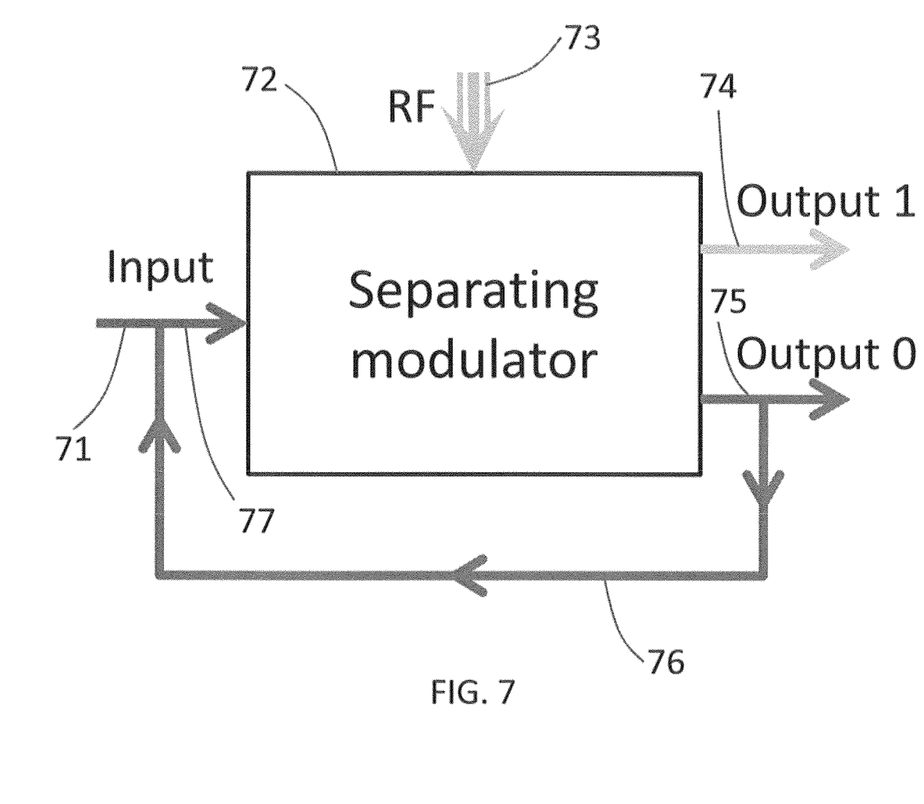
FIG. 7 shows a conceptual diagram incorporating various components, and their functional interconnections, in a modulation system according to the present disclosure.

Thus, aspects of the present invention may be elucidated with the help of the diagram in FIG. 7. An optical beam at the input 71 may be fed into a separating modulator 72, which may also receive a modulating RF signal 73. The separating modulator 72 may modulate the optical beam with the RF signal and may simultaneously separate the first-order sidebands from the carrier so that a resulting signal output from the separating modulator 72, which contains the carrier, is at least largely devoid of first-order sidebands. The modulator output signal containing the carrier, with the first-order sidebands substantially suppressed as a result of the separation, may be substantially directed toward Output 0 denoted with the numeral 75, whereas the first-order sidebands may be substantially directed toward Output 1 denoted with the numeral 74. The separation of the first-order sidebands from the carrier that takes place in the separating modulator 72 may be accomplished by exploiting the constructive and destructive interference of the optical waves corresponding to the carrier wavelength and the modulation-imposed sidebands as they propagate in the multi-mode region of the modulator. The details of how this separation may be accomplished in the example implementations of the present disclosure have been presented above in reference to FIGS. 3-5. The optical beam of Output 0 may be fed back using path 76 to the separating modulator 72 input 77, where it may be combined with the input beam. Since Output 0 may generally contain a substantial portion of the carrier, and may generally be largely devoid of first-order sidebands, due to the substantial suppression of the first-order sidebands, the carrier power in the separating modulator may thus be increased as a result, which may lead to increased modulation efficiency, whereas the bandwidth of the modulator may be maintained (not diminished) on the account of the first-order sidebands not being fed back. Output 1 may be used to collect the result of the modulation in the form of the first-order sidebands.

The elements of the generalized picture of FIG. 7 can be identified in the example implementations presented above. In particular, input 71 in FIG. 7 may correspond to the respective inputs in FIGS. 3 through 4 and 51 in FIGS. 5A-5B. The separating modulator 72 may correspond to the combinations of elements 33, 34, and 35(36) in FIGS. 3A and 3C (3B), elements 43 and 44(45) in FIGS. 4A and 4C (4B), and elements 52, 53, and 54 in FIG. 5A. Output 1, 74 in FIG. 7, may correspond to the outputs in FIGS. 3A, 3C, 4A, 4C, 5A, also labeled as 55 in FIGS. 5A and 5B. The feedback path 76 may correspond to 56 in FIGS. 5A and 5B. In FIGS. 3 and 4, the feedback path may be thought of as shared with the "forward" path, and may comprise splitter 33, balanced MZ interferometer 36, splitter 34, and mirror 32 in FIG. 3B, and splitter 43, unbalanced Michelson interferometer 45, and mirror 42 in FIG. 4B. Semi-transparent mirror 31 and 41 in FIGS. 3 and 4, respectively, may redirect the fed back carrier and to combine it with the input beam—compare junction of the feedback path 76 with the input 71 and 77 in FIG. 7. It should be clear to those skilled in the art that various other arrangements of the respective components can be made that accomplish the functionality of the device presented in the schematic diagram of FIG. 7, and illustrated in examples of FIGS. 3 through 5 accompanied by the respective descriptions.

Figure 6:
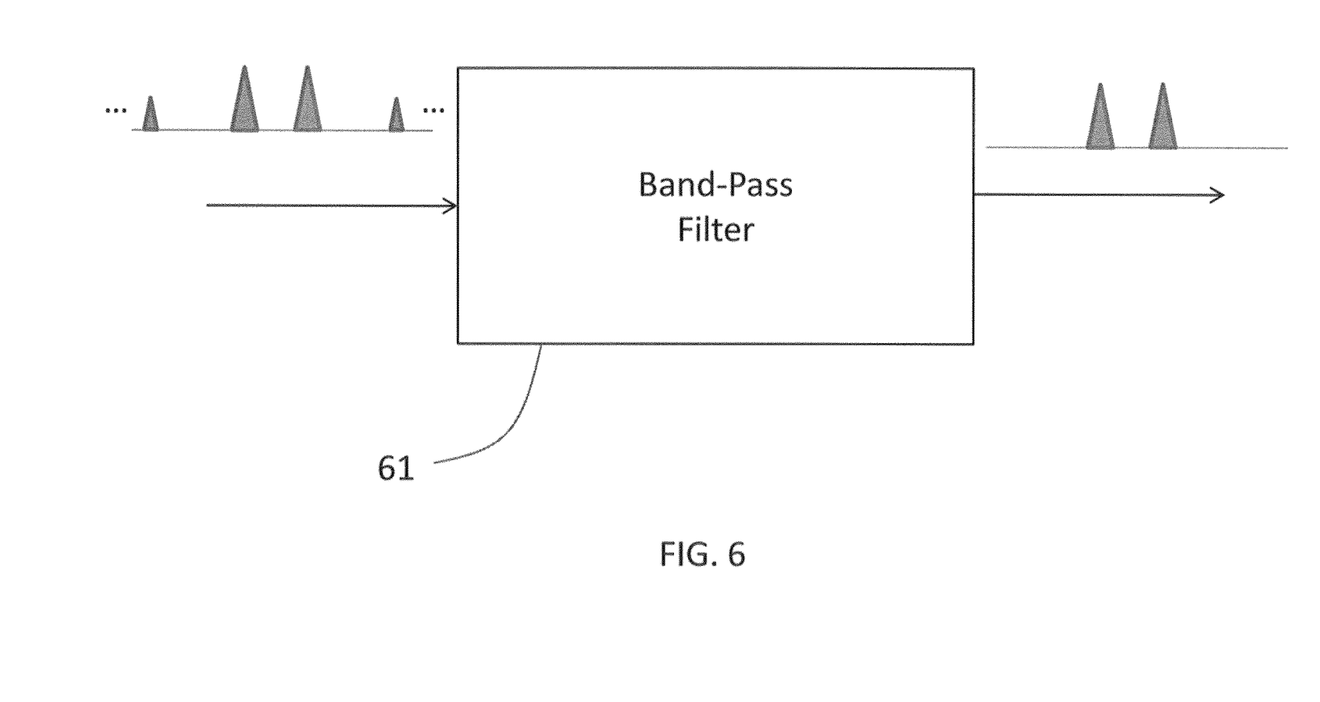
FIG. 6 shows a block diagram relating to various implementations according to the present disclosure.

As shown in the various examples above, the output signal may generally contain not only the first-order sidebands, which may generally contain the desired modulated output signal, but may also contain other, higher-order sidebands, and in particular, higher odd-order sidebands. As shown in the example of FIG. 6, undesired odd-order sidebands, e.g., other than the first-order sidebands, may be filtered out, e.g., by means of a band-pass filter 61. While the example shown in FIG. 6 shows a case in which both first-order sidebands are passed through band-pass filter 61, in some variations, one of the first-order sidebands may also be completely or partially filtered out, which may result in single-sideband or vestigial-sideband signals.

The present techniques may be embodied as a method in which recycled carrier modulation may be implemented by separating the optical carrier of a modulated optical signal from the first-order sidebands of the modulated optical signal and feeding back the carrier to the input of the modulator. As noted above, the separation and feedback may be accomplished by the use of a resonator that may be provided in combination with the optical modulator that modulates the optical carrier.

Various embodiments of the invention have now been discussed in detail; however, the invention should not be understood as being limited to these embodiments. It should also be appreciated that various modifications, adaptations, and alternative embodiments thereof may be made within the scope and spirit of the present invention.

What is claimed is:

1. An apparatus for modulating an optical carrier, the apparatus including:
   a modulator configured to modulate a radio-frequency (RF) signal from an RF input of the modulator onto an optical carrier signal from an optical input of the modulator to generate a modulated signal; and
   an optical apparatus configured to feed back to the optical input of the modulator at least a portion of the optical carrier and even-order sideband components of the modulated signal to the optical input of the modulator and to not feed back the odd-order sideband components of the modulated signal.

2. The apparatus of claim 1, wherein the modulator comprises a push-pull modulator.

3. The apparatus of claim 2, wherein the push-pull modulator includes a Mach-Zehnder interferometer.

4. The apparatus of claim 2, wherein the push-pull modulator includes a Michelson interferometer.

5. The apparatus of claim 1, wherein the optical apparatus comprises an optical resonator, and wherein the optical apparatus is configured to feed back the carrier and even-order sideband components through at least a portion of the modulator.

6. The apparatus of claim 5, wherein the optical resonator comprises a Fabry-Perot resonator.

7. The apparatus of claim 6, wherein the optical resonator includes a semi-transparent mirror and a splitter disposed on a side of the modulator at which the optical input of the modulator is located.

8. The apparatus of claim 7, wherein the optical resonator further includes a mirror disposed at a side of the modulator opposite the side of the modulator at which the optical input of the modulator is located.

9. The apparatus of claim 7, wherein the optical resonator further includes a splitter disposed between the modulator and the mirror.

10. The apparatus of claim 1, wherein the apparatus is further configured to output the odd-order sideband components.

11. The apparatus of claim 10, further comprising a filter configured to suppress odd-order sideband components other than at least one first-order sideband component.

12. A method of modulating a radio-frequency (RF) signal onto an optical carrier signal, the method including:
    modulating an RF input signal onto an optical carrier signal to produce a modulated signal; and
    feeding back at least a portion of optical carrier and even-order sideband components of the modulated signal, without feeding back odd-order sideband components of the modulated signal, and combining the at least a portion of the optical carrier and even-order sideband components with the optical carrier signal prior to said modulating.

13. The method of claim 12, further comprising filtering out odd-order sideband components other than at least a portion of at least one first-order sideband component to obtain a modulated output signal.

14. The method of claim 12, further comprising separating the optical carrier and even-order sideband components of the modulated signal from the odd-order sideband components of the modulated signal prior to said feeding back.

15. An apparatus for modulating an optical carrier, the apparatus including:
    a separating modulator configured to modulate a radio-frequency (RF) signal from an RF input of the modulator onto an optical carrier signal from an optical input of the modulator to generate a modulated signal and to substantially separate resulting first-order sidebands from the optical carrier signal; and
    an optical apparatus configured to feed back at least a portion of the optical carrier signal to the optical input of the modulator and to substantially suppress feedback of the first-order sideband components of the modulated signal.

16. The apparatus of claim 15, further including: an output configured to collect at least a portion of the first-order sidebands of the modulated signal.

17. A method of modulating a radio-frequency (RF) signal onto an optical carrier signal, the method including:
    modulating the RF input signal onto an input optical carrier signal to produce a modulated signal;
    substantially separating resulting first-order sidebands in the modulated signal from an optical carrier signal component in the modulated signal;
    feeding back at least a portion of the optical carrier signal component separated from the first-order sidebands while suppressing feedback of the first-order sidebands components of the modulated signal; and
    combining the at least a portion of the optical carrier signal component with the input optical carrier signal prior to said modulating.

* * * * *